United States Patent
Xu et al.

(10) Patent No.: US 9,491,769 B2
(45) Date of Patent: Nov. 8, 2016

(54) METHOD AND SYSTEM FOR IMPLEMENTING MOBILE RELAY

(71) Applicant: Samsung Electronics Co. Ltd., Suwon-si, Gyeonggi-do (KR)

(72) Inventors: Fangmin Xu, Beijing (CN); Chengjun Sun, Beijing (CN); Yingyang Li, Beijing (CN)

(73) Assignee: Samsung Electronics Co, Ltd., Suwon-si (KR)

( * ) Notice: Subject to any disclaimer, the term of this patent is extended or adjusted under 35 U.S.C. 154(b) by 300 days.

(21) Appl. No.: 13/622,106

(22) Filed: Sep. 18, 2012

(65) Prior Publication Data

US 2013/0072192 A1 Mar. 21, 2013

(30) Foreign Application Priority Data

Sep. 19, 2011 (CN) .......................... 2011 1 0288455

(51) Int. Cl.
| | |
|---|---|
| *H04W 36/00* | (2009.01) |
| *H04W 72/08* | (2009.01) |
| *H04W 16/02* | (2009.01) |
| *H04B 7/155* | (2006.01) |
| *H04W 84/00* | (2009.01) |
| *H04W 84/04* | (2009.01) |

(52) U.S. Cl.
CPC ......... *H04W 72/08* (2013.01); *H04B 7/15542* (2013.01); *H04W 16/02* (2013.01); *H04W 84/005* (2013.01); *H04W 84/047* (2013.01)

(58) Field of Classification Search
CPC .............................. H04W 36/18; H04W 36/30
USPC ........................ 455/436, 509; 370/329, 310.2
See application file for complete search history.

(56) References Cited

U.S. PATENT DOCUMENTS

| | | | |
|---|---|---|---|
| 8,744,506 B2* | 6/2014 | Sadek et al. .................. 455/511 |
| 9,179,444 B2* | 11/2015 | Van Phan ............. H04W 16/26 |
| 2008/0225789 A1 | 9/2008 | Kim et al. |
| 2010/0020974 A1* | 1/2010 | Tsai ...................... H04L 63/068 |
| | | | 380/270 |

(Continued)

FOREIGN PATENT DOCUMENTS

| | | |
|---|---|---|
| JP | 2007-88940 A | 4/2007 |
| JP | 2010-187371 A | 8/2010 |

(Continued)

OTHER PUBLICATIONS

Nortel Networks, Transparent Relay for LTE-Advanced FDD, TSG-RAN1 #53bis, R1-082517, Jun. 25, 2008, Warsaw, Poland.

*Primary Examiner* — Chuck Huynh
(74) *Attorney, Agent, or Firm* — Jefferson IP Law, LLP

(57) ABSTRACT

A method for implementing mobile relay station is provided. The method includes performing spectrum sensing at least one spectrum sensing entity in a base station, a mobile relay station and a user terminal, sending, by the spectrum sensing entity, the result of spectrum sensing to a spectrum managing entity in the mobile communication system, allocating, by the spectrum managing entity available spectrum to a first link between the mobile relay station and the base station and allocating, by the spectrum managing entity, the available spectrums to a second link between the mobile relay station and the user terminal as working spectrum. The present invention also provides a mobile relay station system. The present invention can solve the problem of capacity bottleneck in the backhaul links and access links in high speed wireless environment.

10 Claims, 8 Drawing Sheets

(56) References Cited

U.S. PATENT DOCUMENTS

| | | | |
|---|---|---|---|
| 2010/0056167 A1* | 3/2010 | Guvenc | 455/450 |
| 2011/0158147 A1 | 6/2011 | Li et al. | |
| 2011/0275322 A1 | 11/2011 | Sawai et al. | |
| 2011/0305190 A1* | 12/2011 | Seki | H04B 7/155 370/315 |
| 2012/0122448 A1* | 5/2012 | Mueck et al. | 455/424 |
| 2012/0282932 A1* | 11/2012 | Yu | H04W 84/005 455/437 |
| 2013/0329692 A1* | 12/2013 | Vrzic et al. | 370/329 |
| 2013/0337811 A1* | 12/2013 | Faerber | H04W 36/0072 455/436 |
| 2016/0105805 A1 | 4/2016 | Sawai | |

FOREIGN PATENT DOCUMENTS

| | | |
|---|---|---|
| KR | 10-2008-0084750 A | 9/2008 |
| KR | 10-2011-0080053 A | 7/2011 |
| WO | 2010/084801 A1 | 7/2010 |

\* cited by examiner

METHOD AND SYSTEM FOR IMPLEMENTING MOBILE RELAY

PRIORITY

This application claims the benefit under 35 U.S.C. §119(a) of a Chinese patent application filed on Sep. 19, 2011 in the Chinese Intellectual Property Office and assigned Serial No. 201110288455.4, the entire disclosure of which is hereby incorporated by reference.

BACKGROUND OF THE INVENTION

1. Field of the Invention

The present invention relates to wireless communication systems. More particularly, the present invention relates to a method and a system for implementing mobile relay.

2. Description of the Related Art

A Long Term Evolution-Advanced (LTE-A) system aims at implementing mobility which supports a mobile user moving at a high speed of 350 km/h. High speed movements generate high Doppler shifts, which result in a low data transmission rate of users in high speed movements. In addition, due to the high speed movements, a user needs to perform handover frequently between cells, which is power-consuming. Therefore, optimization of the LTE-A system should be carried out in physical layer and upper layers. High speed movements have been featured in most important scenarios in which mobile communications networks are adopted, and design of the network structure has drawn lots of attention.

In high speed trains, user actions in a wireless network such as handovers and cell reselections occur frequently, and there are bursts in usage of wireless network resources, such as frequent inter-cell handover and reselection in a short period, and the like. High speed movements make a user stay in a cell for a very short time. Consequently, delays in signaling and services may have significant impact on mobility performance of the user in the wireless network. Vehicles in high speed movements usually suffer from large penetration loss, which places high requirements on coverage continuity of the wireless network and power consumption of terminals. In high speed movement scenarios, the Doppler Effect plays an important role, and Doppler shifts have significant impact on service quality. In addition, as wireless communication systems become more prevalent, terminal users may generate high demands for data services. Therefore, current frequency resources cannot satisfy service requirements of terminal users in high speed movements.

At present, according to the related art, one of the solutions to address the demands in high speed movement scenarios is mobile relay stations. 3rd Generation Partnership Project (3GPP) Release 10 (Rel-10) only supports fixed relay, and a relay station can only work on a single frequency with one antenna. In Release 11 (Rel-11), it is being discussed to introduce mobile relay for supporting high speed mobility, and carrier aggregation and multi-antenna are allowed to be used to enhance capacity and performances of mobile relay. At present, the capacity of backhaul links and access links of a relay system has become a bottleneck which impacts user data rate in high speed movements. An enhanced multiple antenna transmission technique is one solution for increasing the capacity of a relay system, but the Doppler shifts have influence on link quality. Another solution for increasing the capacity of a relay system is using carrier aggregation, but spectrum resources that can be used for mobile communication are rare according to the related art.

Therefore a need exists for addressing the bottleneck in backhaul link capacity and access link capacity of a relay system in high speed movement scenarios. For example, a need exists for a system and method for implementing mobile relay.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the abovementioned problems and/or disadvantages and to provide at least the advantages described below. Accordingly, an aspect of the present invention is to provide a method and a system for implementing mobile relay.

Another aspect of the present invention is to provide a method and a system for implementing mobile relay to solve the problem of the bottleneck in backhaul link capacity and access link capacity of a relay system in high speed movement scenarios.

In accordance with an aspect of the present invention, a method for implementing mobile relay is provided. The method includes performing spectrum sensing by at least one spectrum sensing entity in a base station, a wireless relay and a user terminal, sending, by the spectrum sensing entity, a result of the radio spectrum sensing to a spectrum managing entity in a mobile communication system, allocating, by the spectrum managing entity, available spectrum to a first link between the wireless relay and the base station and, allocating, by the spectrum managing entity, the available spectrums to a second link between the wireless relay and the user terminal as working spectrum.

In accordance with another aspect of the present invention, a method for working frequency of the mobile communication system is f0 is provided. The method includes the mobile relay station corresponding to the spectrum sensing entity and the spectrum managing entity, and wherein the method further comprises after e allocating of the available spectrums to the first link and the second link, sending, by the wireless relay, the first working frequency band allocated to the link between the wireless relay and the base station to the base station via f0, sending the second working frequency band allocated to the link between the wireless relay and the user terminal to the user terminal via f0, establishing, by the wireless relay and the base station, a link in the allocated first working frequency band, and establishing, by the wireless relay and the user terminal, a link in the allocated second working frequency band.

In accordance with yet another aspect of the present invention, a method for the working frequency of the mobile communication system is f0 is provided. The method includes the mobile relay station corresponding to the spectrum sensing entity, the base station corresponding to the spectrum managing entity, and wherein the method further comprises after the allocating of the available spectrums to the first link and the second link, sending, by the base station, the first working spectrum allocated to the link between the wireless relay and the base station and the second working frequency band allocated to the link between the wireless relay and the user terminal to the base station via f0, sending, by the wireless relay, the second working frequency band allocated to the link between the wireless relay and the user terminal to the user terminal via f0, establishing, by the wireless relay and the base station, a link in the allocated first working frequency band, and establishing, by the wireless relay and the user terminal, a link in the allocated second working frequency band.

In accordance with still another aspect of the present invention, a method for the working frequency of the mobile communication system is f0 is provided. The method includes the base station corresponding to the spectrum sensing entity and the spectrum managing entity, and wherein the method further comprises after the allocating of the available spectrums to the first link and the second link, sending, by the base station, the first working spectrum allocated to the link between the wireless relay and the base station and the second working frequency band allocated to the link between the wireless relay and the user terminal to the wireless relay via f0, sending, by the wireless relay, the second working frequency band allocated to the link between the wireless relay and the user terminal to the user terminal via f0, establishing, by the wireless relay and the base station, a link in the allocated first working frequency band, and establishing, by the wireless relay and the user terminal, a link in the allocated second working frequency band.

In accordance with yet another aspect of the present invention, a method for the working frequency of the mobile communication system is f0 is provided. The method includes the base station corresponding to the spectrum sensing entity, and the wireless relay corresponding to the spectrum managing entity, and wherein the method further comprises after the allocating of the available spectrums to the first link and the second link, sending, by the wireless relay, the first working frequency band allocated to the link between the wireless relay and the base station to the base station via f0, sending the second working frequency band allocated to the link between the wireless relay and the user terminal to the user terminal via f0, establishing, by the wireless relay and the base station, a link in the allocated first working frequency band, and establishing, by the wireless relay and the user terminal, a link in the allocated second working frequency band.

In accordance with still another aspect of the present invention, a method for the working frequency of the mobile communication system is f0 is provided. The method includes the user terminal corresponding to the spectrum sensing entity, and the wireless relay corresponding to the spectrum managing entity, and wherein the method further comprises after the allocating of the available spectrums to the first link and the second link sending, by the wireless relay, the first working frequency band allocated to the link between the wireless relay and the base station to the base station via f0, sending the second working frequency band allocated to the link between the wireless relay and the user terminal to the user terminal via f0, establishing, by the wireless relay and the base station, a link in the allocated first working frequency band, and establishing, by the wireless relay and the user terminal, a link in the allocated second working frequency band.

In accordance with yet another aspect of the present invention, a method for the working frequency of the mobile communication system is f0 is provided. The method includes at least one of the user terminal and the mobile relay station corresponding to the spectrum sensing entity is, and a standalone spectrum managing entity corresponding to the spectrum managing entity, wherein the method may further include after the allocating of the available spectrums to the first link and the second link, sending, by the spectrum managing entity, the first working frequency band allocated to the link between the wireless relay and the base station to the base station and the wireless relay via f0, sending the second working frequency band allocated to the link between the wireless relay and the user terminal to the wireless relay and the user terminal via f0; establishing, by the wireless relay and the base station, a link in the allocated first working frequency band, and establishing, by the wireless relay and the user terminal, a link in the allocated second working frequency band.

In accordance with still another aspect of the present invention, a method for the spectrum sensing entity performs the spectrum sensing periodically or when triggered by an event according to configurations in the base station is provided.

In accordance with yet another aspect of the present invention, a method for implementing mobile relay in which the spectrum sensing performed by the spectrum sensing entity comprises at least one of following approaches is provided. The method includes at least one of single node spectrum sensing, cooperative spectrum sensing, and geo-location spectrum database.

In accordance with still another aspect of the present invention, a method for implementing mobile relay is provided. The method includes the allocating of the available spectrums to the first link and the second link which includes allocating and managing the available frequency bands according to user service requirements, distribution of the available frequency bands and conditions of interferences.

In accordance with yet another aspect of the present invention, a method for implementing mobile relay is provided. The method may also after a handover of the mobile relay station, re-performing the spectrum sensing and spectrum managing, and exchanging, by adjacent base stations, information of available frequency bands via an X2 interface.

In accordance with still another aspect of the present invention, a method for implementing mobile relay is provided. The method may include transmitting data simultaneously, between the base station and the mobile relay station and between the mobile relay station and the user terminal, via multiple allocated working frequency bands through spectrum aggregation.

In accordance with yet another aspect of the present invention, a method for implementing mobile relay is provided. The method may include monitoring, by the spectrum sensing entity, access techniques in surrounding circumstances on a frequency band being sensed, and selecting, by the spectrum managing entity, an access technique in an allocated working frequency band.

In accordance with still another aspect of the present invention, a system for spectrum sensing and spectrum managing is provided. The system may include a spectrum sensing entity, and a spectrum managing entity, at least one of a base station, a mobile relay station, and a user terminal corresponds to the spectrum sensing entity, the spectrum sensing entity is configured to perform spectrum sensing, and is configured to send the result of spectrum sensing to the spectrum managing entity; and the spectrum managing entity is configured to allocate available spectrum to a first link between the wireless relay and the base station as the first working frequency band, and is configured to allocate available spectrum to a second link between the wireless relay and the user terminal as the second working frequency band.

As can be seen from the above technical scheme, in the method and system for implementing mobile relay in a mobile communication system, firstly, a spectrum sensing entity in the system performs spectrum sensing and sends the result of spectrum sensing to a spectrum managing entity in the system, then the spectrum managing entity in the system allocates unoccupied available spectrum to the link between a mobile relay station and a base station and to the link between the mobile relay station and a user terminal as a working frequency band, therefore the mobile relay station and the base station may establish a backhaul link on the allocated working frequency band, the mobile relay station and the user terminal may establish an access link on the allocated working frequency band, thus the problem of the bottleneck in the backhaul link between the base station and the mobile relay station and in the access link between the mobile relay station and the user terminal can be solved.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

The same reference numerals are used to represent the same elements throughout the drawings.

DETAILED DESCRIPTION OF EXEMPLARY EMBODIMENTS

Figure 1:
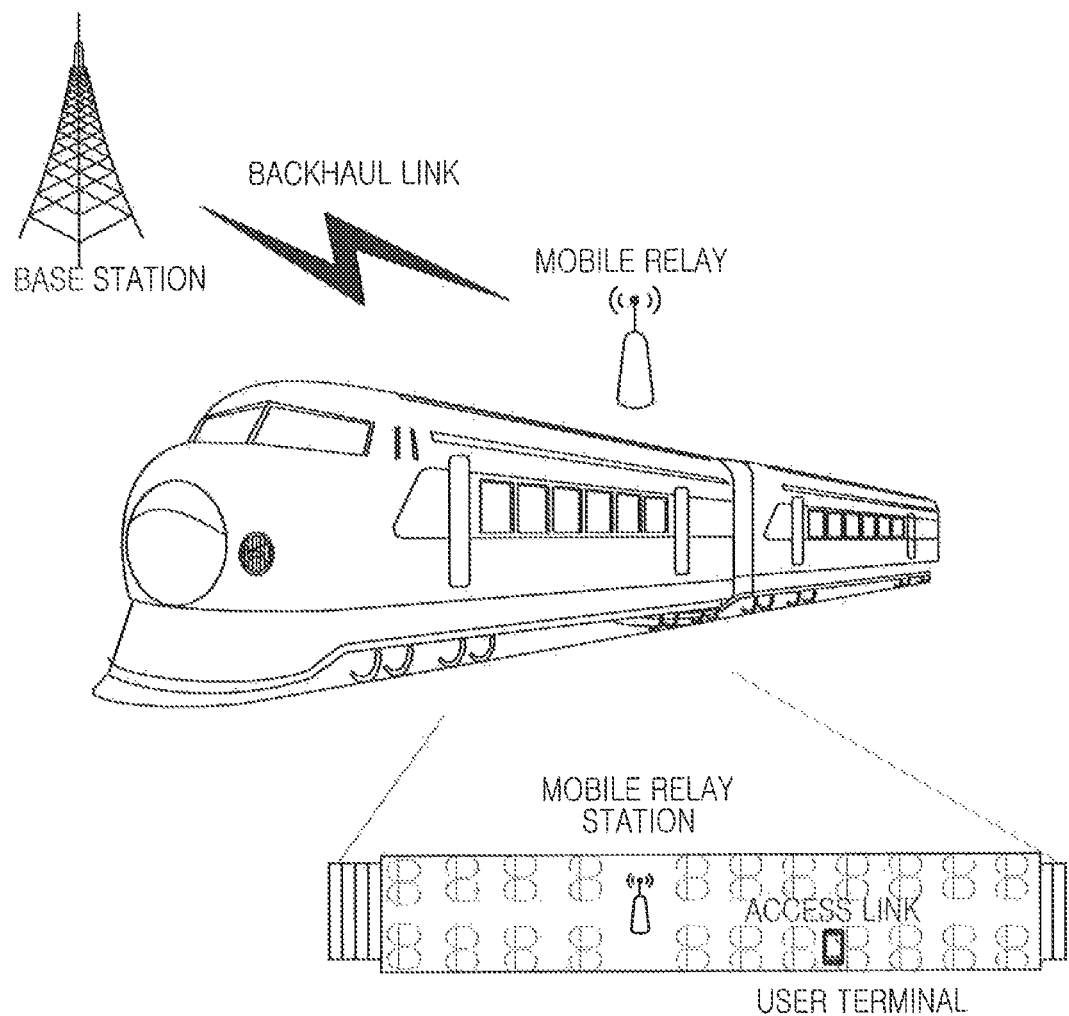
FIG. 1 is a schematic illustrating a structure of a wireless communication system for a high speed train according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the exemplary embodiments of the present invention described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention is hereinafter further described in detail with reference to the accompanying drawings as well as exemplary embodiments of the present invention so as to make the objective, technical solution and merits thereof more apparent.

A Cognitive Radio technique is a spectrum sharing technique for addressing the problem of rare spectrum resources for future wireless communications and low resource utility ratio of related-art spectrum allocation schemes. The Cognitive Radio technique guarantees transmission of a cognitive device while avoiding interference to authorized users. Cognitive Devices use the spectrum by performing spectrum sensing on surrounding radio environments and by selecting a proper unoccupied working frequency band based on the spectrum sensing result and by adjusting wireless transmission parameters.

Exemplary embodiments of the present invention provide a method and a system for implementing mobile relay based on Cognitive Radio. The system may include a mobile relay station, a base station and a user terminal. The user terminal and the base station transmit data via the mobile relay station. Data between the user terminal and the mobile relay station, and data between the mobile relay station and the base station are not transmitted on the same frequency band by spectrum sensing using Cognitive Radio and spectrum management.

As an example, a downlink communication method of the mobile relay system includes data destined for the user terminal sent by the base station being transmitted through the mobile relay station and then reaching the user terminal. Uplink communication manner includes data destined for the base station sent by the user terminal being transmitted through the mobile relay station and then reaching the base station.

According to exemplary embodiments of the present invention, a spectrum sensing module and a spectrum managing module according to Cognitive Radio may be included in the mobile relay station, in the mobile user terminal, or in the base station. According to exemplary embodiments of the present invention, the spectrum sensing module looks for enough unoccupied frequency bands by performing spectrum sensing periodically or when triggered by an event. The spectrum managing module selects a proper working frequency band from the unoccupied frequency bands found by the spectrum sensing module, reports the working frequency band selected for the user terminal and the mobile relay station to the user terminal and the mobile relay station, and reports the working frequency band selected for the mobile relay station and the base station to the mobile relay station and the base station. The spectrum managing module allocates and manages frequency bands according to user service requirements, distribution of the unoccupied frequency bands and condition of interferences.

After unoccupied frequency bands are found, data may be transmitted between the base station and the mobile relay station, and between the mobile relay station and the user terminal by using spectrum aggregation or simultaneous transmission using multiple radio access techniques.

The following description takes a mobile communication system for a high speed railway as an example.

FIG. 1 is a schematic illustrating a structure of a wireless communication system for a high speed train according to an exemplary embodiment of the present invention.

Referring to FIG. 1, the system includes a base station, a mobile relay station, and a user terminal device.

The mobile relay station is installed on a high speed train, and includes an outer carriage unit and an inner carriage unit. For example, the mobile relay station may be installed on top of the high speed train. A radio frequency sub unit in the outer carriage unit establishes a connection with the base station to avoid the impact of the carriage penetration loss on the wireless link. A radio frequency sub unit in the inner carriage unit establishes a connection directly with the user terminal in the carriage to avoid the impact on the wireless link from the Doppler shifts resulting from the high speed movements of the train. A train may be equipped with one or multiple mobile relay stations. A mobile relay station is connected with the radio frequency sub units in the carriage to cover all carriages of the train. As an example, the mobile relay station may be connected to the radio frequency sub units in the carriage via fiber. Exemplary embodiments of the present invention are not only applicable for mobile communication system for high speed railway, but also applicable for mobile relay scenarios in other mobile communication systems, such as for dynamic cell load balancing, and for enhancing system reliability of fixed relay stations.

The system shown in FIG. 1 includes two transmission links. For example, the transmission links include the link between the base station and the mobile relay station, and the link between the mobile relay station and the user terminal, which are referred to as a backhaul link and an access link, respectively.

The backhaul link and the access link may operate on the same frequency band or on different frequency bands. In this exemplary embodiment of the present invention, it is assumed that the backhaul link and the access link work on different frequency bands. Taking the Long Tem Evolution-Advanced (LTE-A) system as an example, it is assumed that the working frequency of the LTE-A system is f0.

Figure 2:
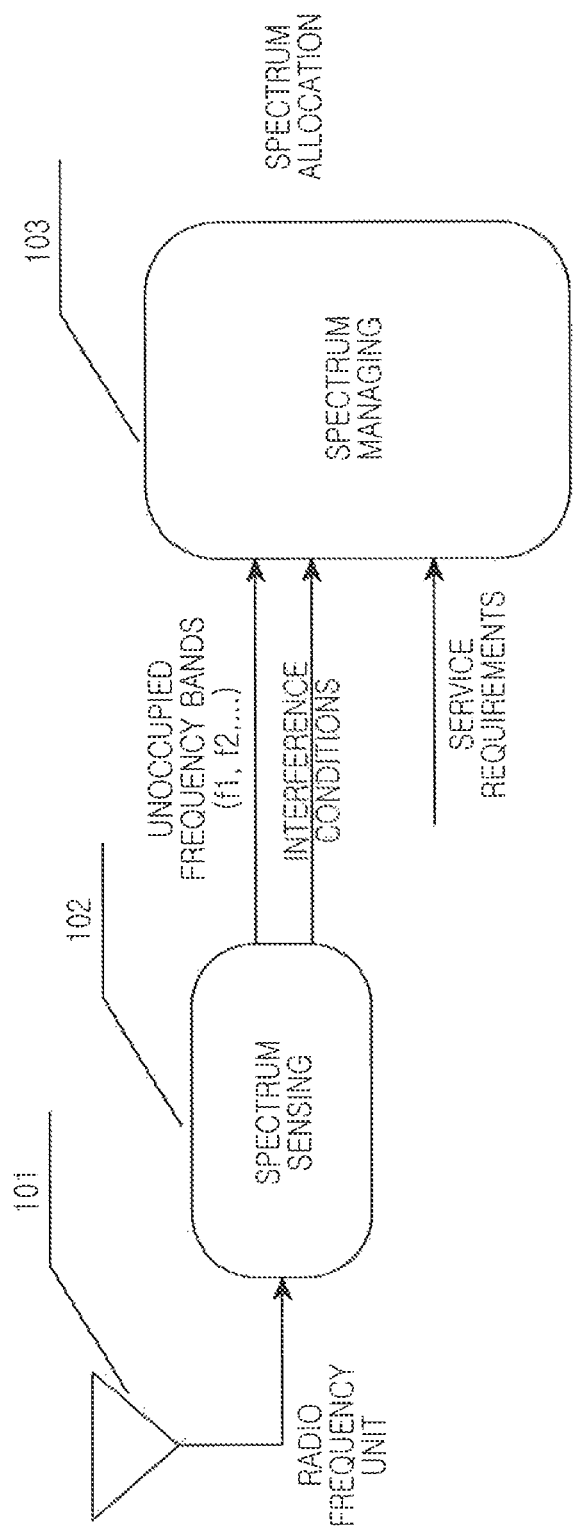
FIG. 2 is a schematic illustrating a structure of an apparatus having cognitive radio capabilities according to an exemplary embodiment of the present invention.

FIG. 2 is a schematic illustrating a structure of an apparatus having a cognitive radio module according to an exemplary embodiment of the present invention.

Referring to FIG. 2, the apparatus may include a radio frequency antenna 101, a spectrum sensing module 102, and a spectrum managing module 103. The modules may reside in one apparatus or may be distributed in different apparatuses in the system.

According to exemplary embodiments of the present invention, the radio frequency antenna is configured for receiving wireless signals from the surrounding environment.

According to exemplary embodiments of the present invention, the spectrum sensing module is configured for performing spectrum detection to detect interference between an unoccupied spectrum hole and each frequency band. The spectrum detection may be implemented by using, but not limited to an energy detector, a matched filter, a cyclostationarity-based detection, cooperative spectrum sensing, geolocation spectrum database, and the like.

According to exemplary embodiments of the present invention, the spectrum managing module is configured for allocating unoccupied frequency bands to the backhaul link and the access link according to user service requirements, distributions of the unoccupied frequency band, and interference conditions.

Figure 3:
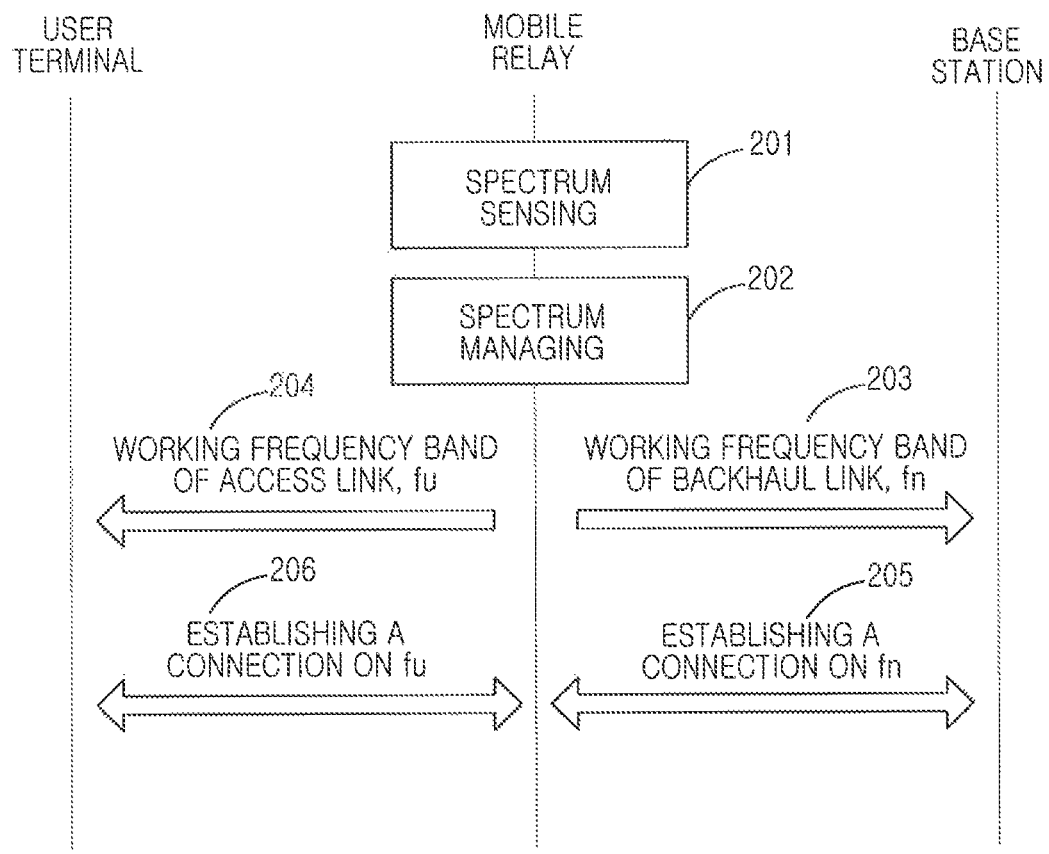
FIG. 3 is a flowchart illustrating a method for implementing mobile relay according to an exemplary embodiment of the present invention.

According to a first method, the cognitive radio module (including spectrum sensing and spectrum managing) is located in the mobile relay station. FIG. 3 illustrates the configuration of such a method.

FIG. 3 is a flowchart illustrating a method for implementing mobile relay according to an exemplary embodiment of the present invention.

Referring to FIG. 3, the method may include the following procedures.

In step 201, when the bandwidth of the LTE-A system is not sufficient to satisfy the demands of user data in the train, the spectrum sensing module in the mobile relay station performs spectrum sensing, searching in the train and out of the train for available spectrum holes which are denoted by f1, f2, . . . fN (wherein the number of unoccupied frequency bands is assumed to be N).

In step 202, the spectrum managing module divides and classifies the spectrum holes into three classes, namely backhaul frequency bands, access frequency bands, and unoccupied frequency bands based on interference conditions of the spectrum holes, bandwidths, frequency gap of the spectrum holes, bandwidth demands of users, and the like.

In step 203, the mobile relay station sends a selected backhaul frequency band fn (one or multiple of f1, f2, . . . fN) to the base station via f0.

In step 204, the mobile relay station sends a selected access frequency band fu (one or multiple of f1, f2, . . . fN) to the user terminal via f0.

In steps 205 and 206, a link is established between the base station and the mobile relay station on the backhaul frequency band, a link is established between the mobile relay station and the user terminal on the access frequency band, and data is transmitted simultaneously on multiple frequency bands by using carrier aggregation, and the like.

Figure 4:
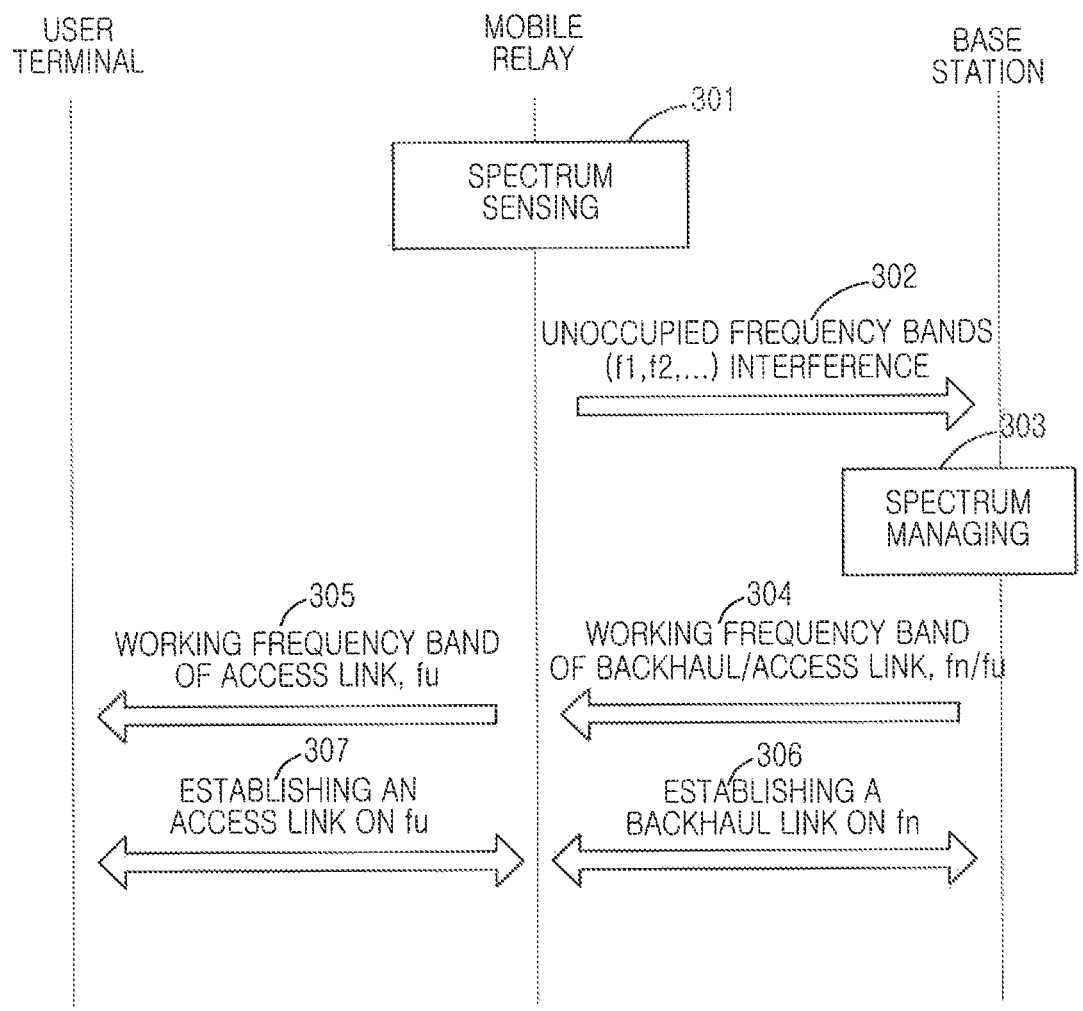
FIG. 4 is a flowchart illustrating a method for implementing mobile relay according to an exemplary embodiment of the present invention.

According to a second method, the spectrum sensing module of cognitive radio is located in the mobile relay station, and the spectrum managing module of cognitive radio located in the base station. FIG. 4 illustrates a configuration of such a method.

FIG. 4 is a flowchart illustrating a method for implementing mobile relay according to an exemplary embodiment of the present invention.

Referring to FIG. 4, the method may include the following procedures.

In step 301, when the bandwidth of the LTE-A system is not sufficient to satisfy the demands of user data in the train, the spectrum sensing module in the mobile relay station performs spectrum sensing, searching in the train and out of the train for available spectrum holes which are denoted by f1,f2, . . . fN (wherein the number of unoccupied frequency bands is assumed to be N).

In step 302, the mobile relay station sends the spectrum holes detected and interference conditions to the spectrum managing module in the base station via f0.

In step 303, the spectrum managing module divides and classifies the spectrum holes into three classes, namely backhaul frequency bands, access frequency bands, and unoccupied frequency bands based on interference conditions of the spectrum holes, bandwidths, frequency intervals of the spectrum holes and bandwidth demands of users, and the like.

In step 304, the base station sends selected backhaul frequency band fn (one or multiple of f1, f2, . . . fN) and selected access frequency band fu (one or multiple of f1, f2, . . . fN) to the mobile relay station via f0.

In step 305, the mobile relay station sends the access frequency band fu to the user terminal.

In steps 306 and 307, a link is established between the base station and the mobile relay station on the backhaul frequency band, a link is established between the mobile relay station and the user terminal on the access frequency band, and data is transmitted simultaneously on multiple frequency bands by using carrier aggregation, and the like.

Figure 5:
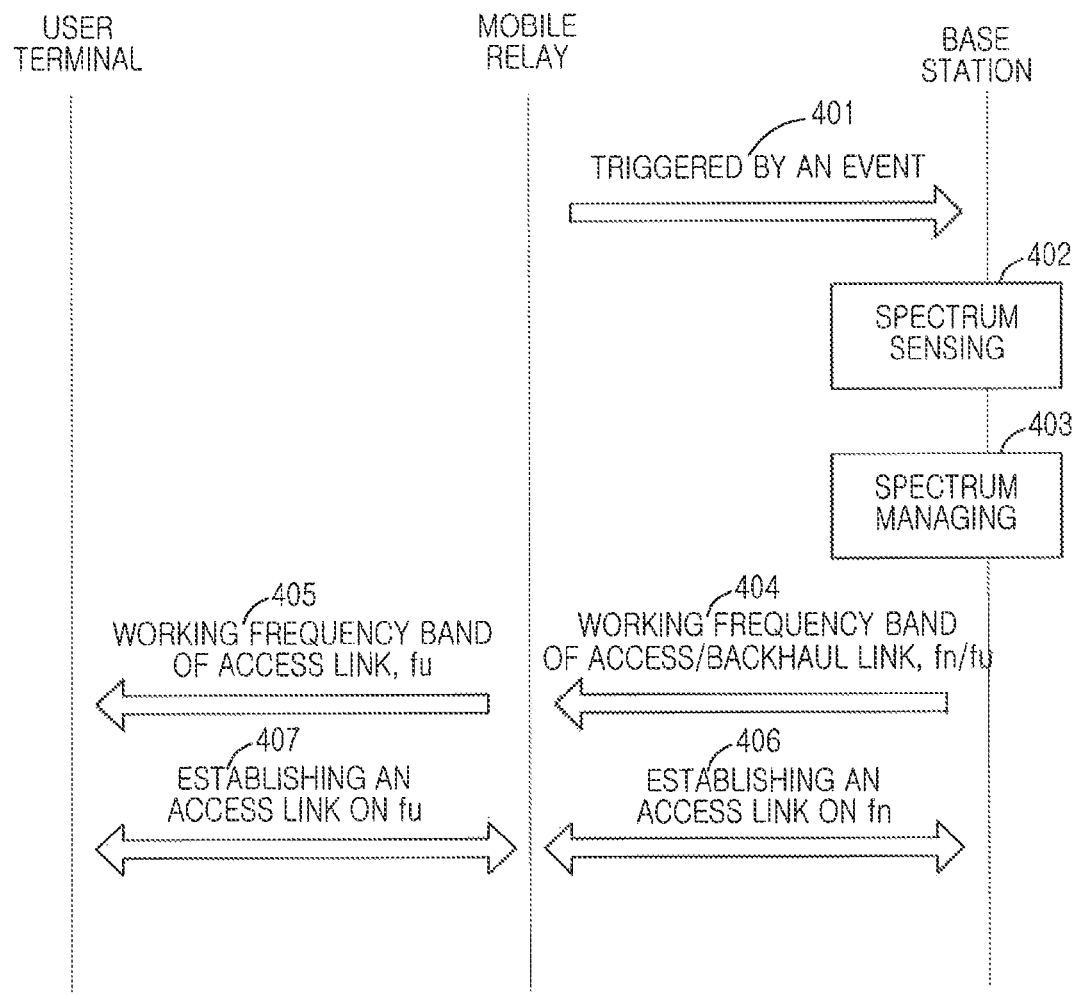
FIG. 5 is a flowchart illustrating a method for implementing mobile relay according to an exemplary embodiment of the present invention.

According to a third method, the cognitive radio module (including spectrum sensing and spectrum managing) is located in the base station. FIG. 5 illustrates a configuration of such a method.

FIG. 5 is a flowchart illustrating a method for implementing mobile relay according to an exemplary embodiment of the present invention.

Referring to FIG. 5, the method may include the following procedures.

In step 401, when the bandwidth of the LTE-A system is not sufficient to satisfy the demands of user data in the train, the mobile relay station triggers the base station to perform the procedures in step 402.

In step 402, the spectrum sensing module in the base station performs spectrum sensing, searching for available spectrum holes which are denoted by f1,f2, . . . fN (wherein the number of unoccupied frequency bands is assumed to be N).

In step 403, the spectrum managing module in the base station divides and classifies the spectrum holes into three classes, namely backhaul frequency bands, access frequency bands, and unoccupied frequency bands based on interference conditions of the spectrum holes, bandwidths, frequency intervals of the spectrum holes and bandwidth demands of users, and the like.

In step 404, the base station sends selected backhaul frequency bands fn (one or multiple of f1, f2, . . . fN) and selected access frequency bands fu (one or multiple of f1, f2, . . . fN) to the mobile relay station via f0.

In step 405, the mobile relay station sends the access frequency band fu to the user terminal.

In steps 406 and 407, a link is established between the base station and the mobile relay station on the backhaul frequency band, a link is established between the mobile relay station and the user terminal on the access frequency band, and data is transmitted simultaneously on multiple frequency bands by using carrier aggregation, and the like.

Figure 6:
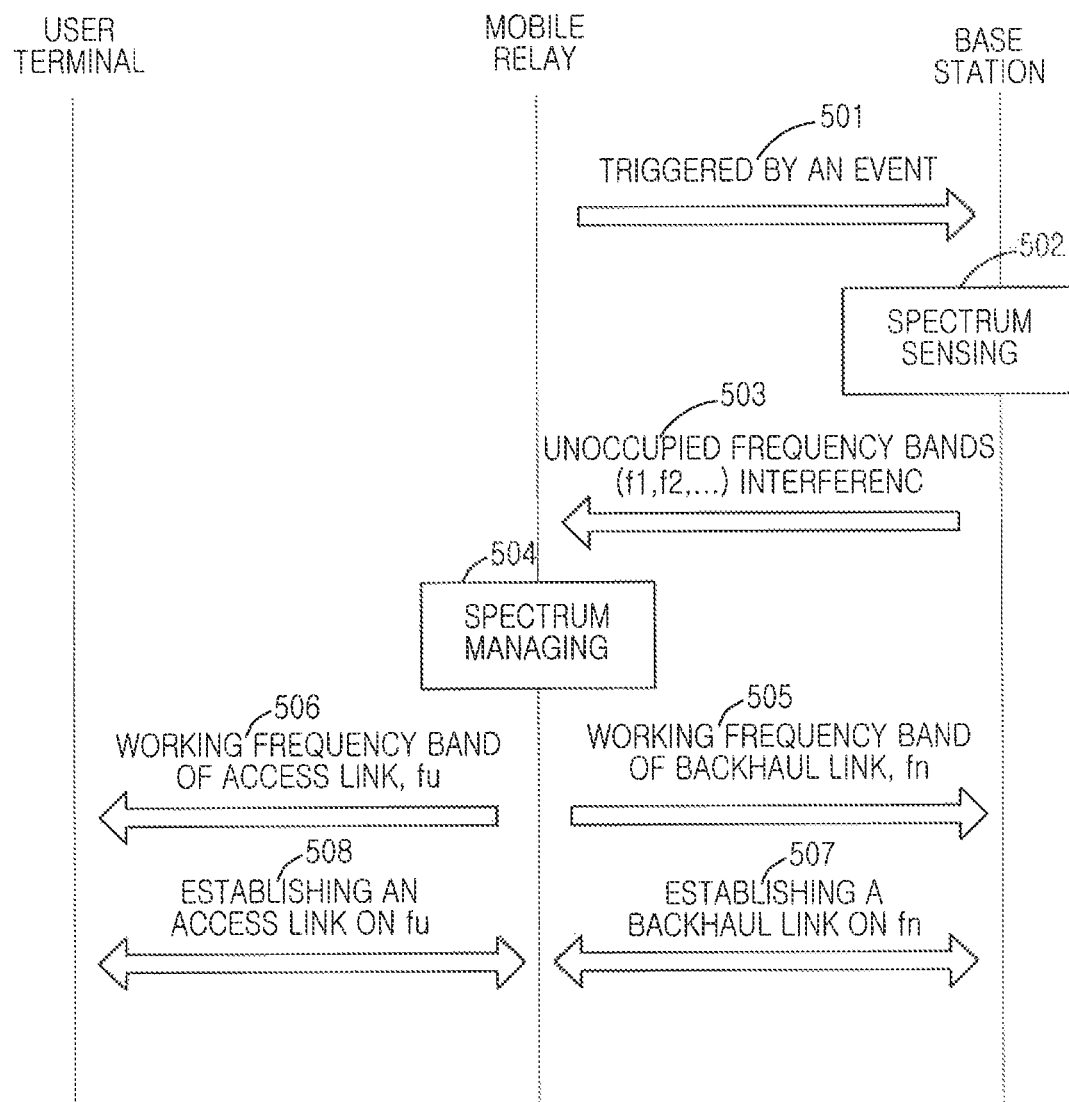
FIG. 6 is a flowchart illustrating a method for implementing mobile relay according to an exemplary embodiment of the present invention.

According to a fourth method, the spectrum sensing module of cognitive radio is located in the base station, and the spectrum managing module of cognitive radio located in the mobile relay station. FIG. 6 illustrates a configuration of such a method.

FIG. 6 is a flowchart illustrating a method for implementing mobile relay according to an exemplary embodiment of the present invention.

Referring to FIG. 6, the method may include the following procedures.

In step 501, when the bandwidth of the LTE-A system is not sufficient to satisfy the demands of user data in the train, the mobile relay station triggers the base station to perform the procedures in step 502.

In step 502, the spectrum sensing module in the base station performs spectrum sensing, searching for available spectrum holes which are denoted by f1,f2, . . . fN (wherein the number of unoccupied frequency bands is assumed to be N).

In step 503, the base station sends the spectrum holes detected and interference conditions to the spectrum managing module in the mobile relay station via f0.

In step 504, the spectrum managing module in the mobile relay station divides and classifies the spectrum holes into three classes, namely backhaul frequency bands, access frequency bands, and unoccupied frequency bands based on interference conditions of the spectrum holes, bandwidths, frequency intervals of the spectrum holes and bandwidth demands of users, and the like.

In step 505, the mobile relay station sends selected backhaul frequency bands fn (one or multiple of f1, f2, . . . fN) to the base station via f0.

In step 506, the mobile relay station sends selected access frequency bands fu (one or multiple of f1, f2, . . . fN) to the user terminal via f0.

In steps 507 and 508, a link is established between the base station and the mobile relay station on the backhaul frequency band, a link is established between the mobile relay station and the user terminal on the access frequency band, and data is transmitted simultaneously on multiple frequency bands by using carrier aggregation, and the like.

Figure 7:
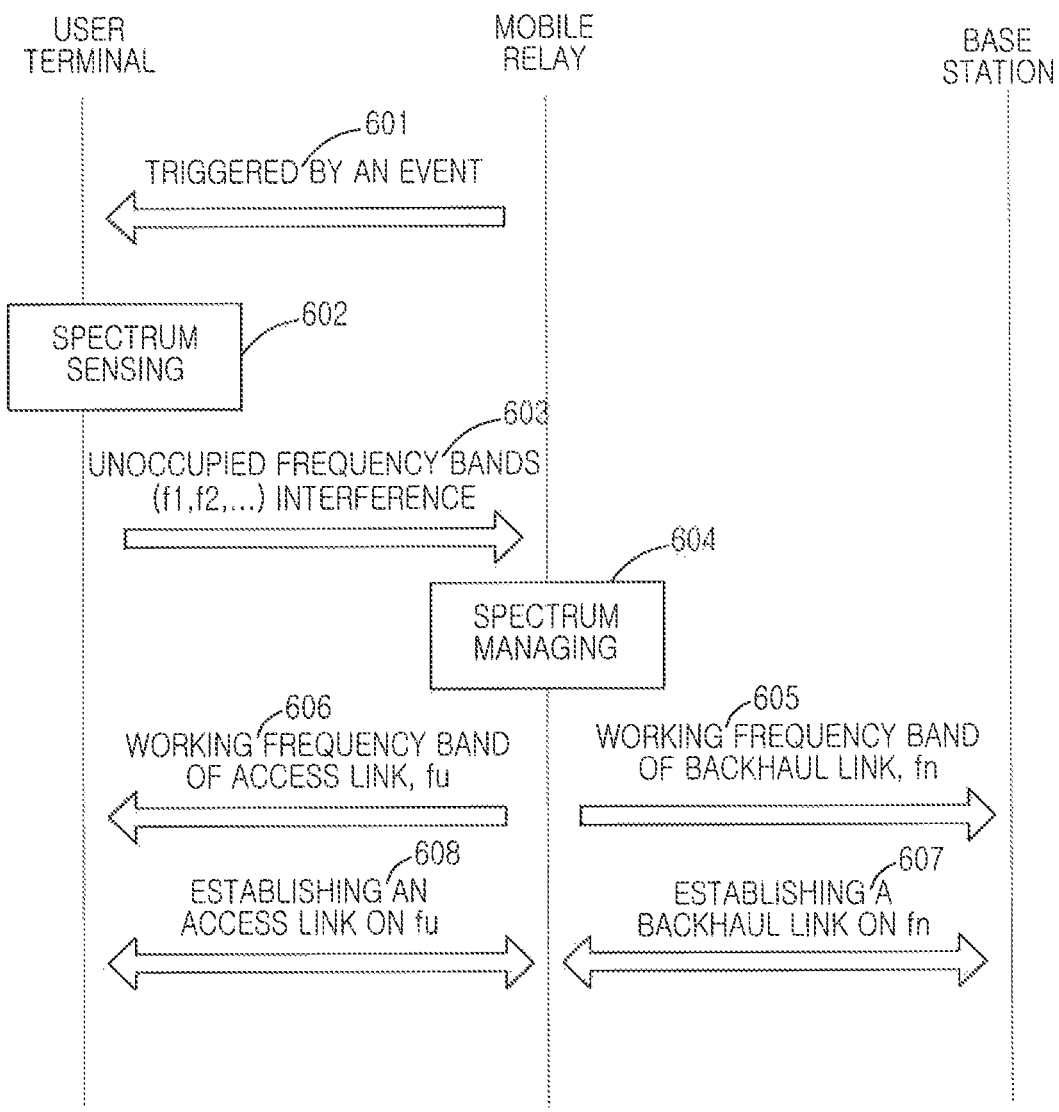
FIG. 7 is a flowchart illustrating a method for implementing mobile relay according to an exemplary embodiment of the present invention.

According to a fifth method, the spectrum sensing module of cognitive radio is located in the user terminal, and the spectrum managing module of cognitive radio located in the mobile relay station. FIG. 7 illustrates a configuration of such a method.

FIG. 7 is a flowchart illustrating a method for implementing mobile relay according to an exemplary embodiment of the present invention.

Referring to FIG. 7, the method may include the following procedures.

In step 601, when the bandwidth of the LTE-A system is not sufficient to satisfy the demands of user data in the train, the mobile relay station triggers the user terminal to perform the procedures in step 602.

In step 602, the spectrum sensing module in the user terminal performs spectrum sensing, searching for available spectrum holes which are denoted by f1,f2, . . . fN (wherein the number of unoccupied frequency bands is assumed to be N).

In step 603, the user terminal sends the spectrum holes detected and interference conditions to the spectrum managing module in the mobile relay station via f0.

In step 604, the spectrum managing module in the mobile relay station divides and classifies the spectrum holes into three classes, namely backhaul frequency bands, access frequency bands, and unoccupied frequency bands based on interference conditions of the spectrum holes, bandwidths, frequency intervals of the spectrum holes and bandwidth demands of users and the like.

In step 605, the mobile relay station sends selected backhaul frequency bands fn (one or multiple of f1, f2, . . . fN) to the base station via f0.

In step 606, the mobile relay station sends selected access frequency bands fu (one or multiple of f1, f2, . . . fN) to the user terminal via f0.

In steps 607 and 608, a link is established between the base station and the mobile relay station on the backhaul frequency band, a link is established between the mobile relay station and the user terminal on the access frequency band, and data is transmitted simultaneously on multiple frequency bands by using carrier aggregation, and the like.

Figure 8:
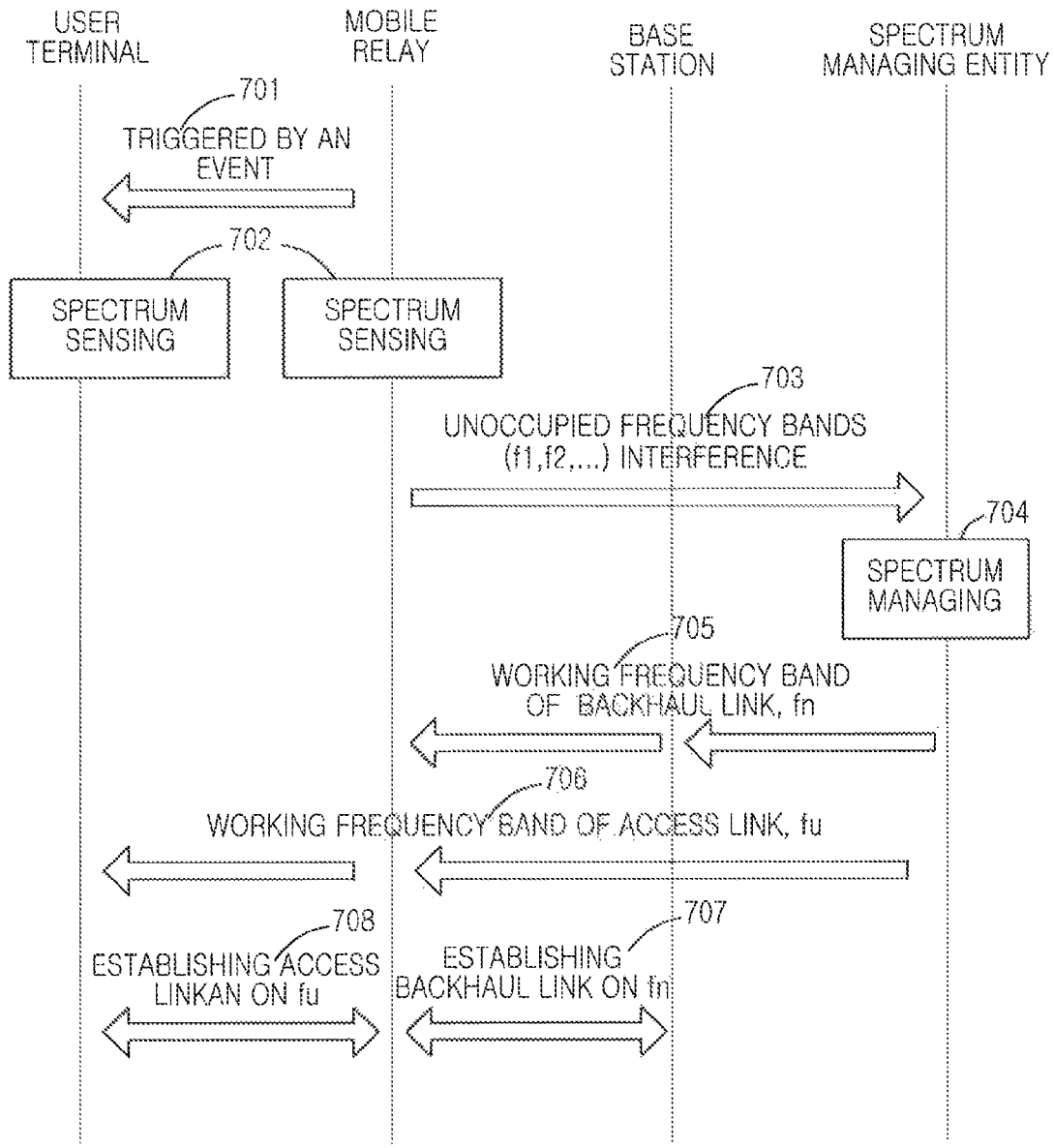
FIG. 8 is a flowchart illustrating a method for implementing mobile relay according to an exemplary embodiment of the present invention.

According to a sixth method, the spectrum managing module of cognitive radio is located in a standalone physical entity which is referred to as a spectrum managing entity, and the spectrum sensing module of cognitive radio located in the user terminal and/or the mobile relay station. FIG. 8 illustrates a configuration of such a method.

FIG. 8 is a flowchart illustrating a method for implementing mobile relay according to an exemplary embodiment of the present invention.

Referring to FIG. 8, the method may include the following procedures.

In step 701, when the bandwidth of the LTE-A system is not sufficient to satisfy the demands of user data in the train, the mobile relay station triggers the spectrum sensing. In this step, the mobile relay station may trigger the mobile relay station to perform the spectrum sensing process, may trigger the user terminal to perform the spectrum sensing process, or may trigger the mobile relay station and the user terminal to perform the spectrum sensing process.

In step 702, the spectrum sensing module in the user terminal and/or the mobile relay station performs spectrum sensing, searching for available spectrum holes which are denoted by f1,f2, . . . fN (wherein the number of unoccupied frequency bands is assumed to be N).

In step 703, the mobile relay station sends the spectrum holes detected and interference conditions to the spectrum managing entity via f0.

In step 704, the spectrum managing entity divides and classifies the spectrum holes into three classes, namely backhaul frequency bands, access frequency bands, and unoccupied frequency bands based on interference conditions of the spectrum holes, bandwidths, frequency intervals of the spectrum holes and bandwidth demands of users, and the like.

In step 705, the spectrum managing entity sends a selected backhaul frequency band fn (one or multiple of f1, f2, . . . fN) to the base station and the mobile relay station via f0.

In step 706, the spectrum managing entity sends a selected access frequency band fu (one or multiple of f1, f2, . . . fN) to the mobile relay station and the user terminal via f0.

In steps 707 and 708, the base station and the mobile relay station establish a link between the base station and the mobile relay station on the backhaul frequency band, the mobile relay station and the user terminal establish a link between the mobile relay station and the user terminal on the access frequency band, and data is transmitted simultaneously on multiple frequency bands by using carrier aggregation, and the like.

The spectrum sensing module may be configured by the base station as periodical sensing or sensing triggered by events. For periodical sensing, when the spectrum sensing module is located in the mobile relay station or the user terminal, the base station may semi-statically configure the length of the period of the spectrum sensing module via Radio Resource Control (RRC) signaling. For sensing triggered by events, the base station or the mobile relay station equipped with the spectrum sensing module starts the spectrum sensing when the spectrum resources are not enough to satisfy the demands of the user terminal.

The spectrum sensing performed by the spectrum sensing module may include single node spectrum sensing, cooperative spectrum sensing, geolocation spectrum database, and the like. For single node spectrum sensing, the entity equipped with the spectrum sensing module performs spectrum sensing on its own to searching for available unoccupied spectrum.

For cooperative spectrum sensing, multiple nodes equipped with the spectrum sensing module report respective spectrum sensing results irregularly via the Physical Uplink Shared Channel (PUSCH) or periodically via the Physical Uplink Control Channel (PUCCH). The spectrum sensing results accumulate in the mobile relay station or the base station, and the mobile relay station and the base station process the sensing results from the multiple nodes with the spectrum sensing module by using data merging (e.g., such as logic OR operation).

For geolocation spectrum database, the mobile relay station or the user terminal obtains information of the geolocations of itself by using a GPS device or through other wireless positioning methods, and accesses a uniformly spectrum database via the backhaul link to inquire available unoccupied spectrum and wireless access techniques at the geolocation of the mobile relay station or the user terminal.

The spectrum managing module allocates and manages frequency bands according to user service requirements, distribution of the unoccupied frequency bands, and condition of interferences. An exemplary method for allocating spectrum according to the present invention may include:

determining the proportion of spectrum resources allocated to the backhaul link and the access link and a duplexing mode (e.g., Frequency Division Duplexing (FDD) and/or Time Division Duplexing (TDD)) adopted in the backhaul link and the access link based on the amount of uplink and downlink service demands of the user terminal;

2) sorting the unoccupied frequency bands in an ascending order of the frequency based on distributions of the detected spectrum holes or the unoccupied frequency bands found from the database to reduce interference between the backhaul link and the access link;

3) allocating unoccupied frequency bands with lower frequency and unoccupied frequency bands with higher frequency to the backhaul link and the access link respectively according to the demands for spectrum resources of the backhaul link and the access link, calculating the potential capacity of each unoccupied frequency band based on the power of the interference and estimated path loss of each frequency band, and allocating enough frequency bands to satisfy the service demands of the backhaul link and the access link respectively when allocating the spectrum;

4) calculating long term availability of each unoccupied frequency band, where, for example, the bigger the chance of being occupied by an licensed system within a period of time, the lower the long term availability is;

5) among various combination of unoccupied frequency bands that satisfy the above conditions, a combination which has the most amount of spectrum resource blocks and relatively higher long term availability is preferably selected to reduce the complexity of system devices and reduce the number of spectrum handover performed; and 6) when the capacity of all the unoccupied frequency bands is not sufficient to satisfy the service requirements of the user terminal, informing the user terminal to reduce service requirements, and re-performing the spectrum allocation according to the reduced service requirements.

When the mobile relay station is performing handover, the adjacent two base stations before and after the handover may exchange information of unoccupied frequency bands occupied by the mobile relay station via an X2 interface. For example, the serving base station may share the information of the unoccupied frequency bands being used by the mobile relay station with the target base station, the target base station performs spectrum sensing or inquires the spectrum database in advance to determine whether the frequency bands are available, so as to decrease the handover delay and reduce the number of spectrum handover performed.

Besides allocating unoccupied spectrum resources, the spectrum sensing module may also detect radio access networks existing in surrounding environment, such as, for example, a Wideband Code Division Multiple Access (WCDMA) network, a Long Term Evolution (LTE) network, a Wireless Local Area Network (WLAN) network, and the like. The spectrum managing module selects one or multiple proper access techniques for the backhaul link between the base station and the mobile relay station based on factors including user service requirements, channel conditions, interference conditions, and the like. The access link between the mobile relay station and the user terminal may also adopt one or multiple access techniques. For example, the unoccupied frequency band of f1 may be allocated to a WCDMA network, and the unoccupied frequency band of f2 may be allocated to an LTE network to increase spectrum utility ratio and to satisfy requirements of user terminal supporting different communication systems.

The foregoing are only exemplary embodiments of the present invention and are not for use in limiting the protection scope thereof. All modifications, equivalent replacements or improvements in accordance with the spirit and principles of the present disclosure shall be included in the protection scope of the present disclosure.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile relay station in a mobile communication system, the method comprising:
   performing, by the mobile relay station, spectrum sensing of available frequency bands,
   classifying the available frequency bands into a plurality of spectrums comprising first available spectrums and second available spectrums;
   allocating, by the mobile relay station, the first available spectrums to a first link between the mobile relay station and a base station as first working frequency bands;
   allocating, by the mobile relay station, the second available spectrums to a second link between the mobile relay station and a user terminal as second working frequency bands; and
   transmitting, by the mobile relay station, information on the first working frequency bands to the base station and the second working frequency bands to the user terminal.

2. The method of claim 1,
   wherein a working frequency of the mobile communication system is f0, and
   wherein the method further comprises after transmitting the information on the first working frequency bands and second working frequency bands:
   establishing, by the mobile relay station, a link with the base station in the allocated first working frequency band, and
   establishing, by the mobile relay station, a link with the user terminal in the allocated second working frequency band.

3. The method of claim 1, wherein the mobile relay station performs the spectrum sensing periodically or when triggered by an event according to configurations in the base station.

4. The method of claim 1, wherein the spectrum sensing performed by the mobile relay station comprises at least one of single node spectrum sensing, cooperative spectrum sensing, and geolocation spectrum sensing using a database.

5. The method of claim 1, wherein the allocating of the first available spectrums and the second available spectrums to the first link and to the second link comprises:
   allocating and managing available frequency bands according to user service requirements, a distribution of the available frequency bands, and conditions of interferences.

6. The method of claim 1, further comprising:
   after a handover of the mobile relay station, re-performing the spectrum sensing and spectrum managing, and
   exchanging, by adjacent base stations, information on available frequency bands via an X2 interface.

7. The method of claim 1, further comprising:
   transmitting data simultaneously, between the base station and the mobile relay station and between the mobile relay station and the user terminal, via multiple allocated working frequency bands through spectrum aggregation.

8. The method of claim 1, further comprising:

monitoring, by the mobile relay station, access techniques in surrounding circumstances on a frequency band being sensed, and selecting, by the mobile relay station, an access technique in an allocated working frequency band.

9. An apparatus of a mobile relay station in a mobile communication system, the system comprising:

a spectrum sensing entity configured to perform spectrum sensing of available frequency bands; and a spectrum managing entity configured to:

classify the available frequency bands into a plurality of spectrums comprising first available spectrums and second available spectrums, allocate the first available spectrums to a first link between the mobile relay station and a base station as first working frequency bands, allocate the second available spectrums to a second link between the mobile relay station and a user terminal as second working frequency bands, and transmit information on the first working frequency bands to the base station and the second working frequency bands to the user terminal.

10. The apparatus of claim 9, wherein a working frequency of the system is f0, and wherein the spectrum managing entity is configured to, after the transmission of the information on the first working frequency band and the second working frequency band:

establish, between the mobile relay station and the base station, a link in the allocated first working frequency band, and establish between the mobile relay station and the user terminal, a link in the allocated second working frequency band.

* * * * *